(12) United States Patent
Puckette

(10) Patent No.: US 6,385,721 B1
(45) Date of Patent: May 7, 2002

(54) COMPUTER WITH BOOTABLE HIBERNATION PARTITION

(75) Inventor: Robert B. E. Puckette, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/235,965

(22) Filed: Jan. 22, 1999

(51) Int. Cl.[7] .................................................. G06F 9/00
(52) U.S. Cl. ........................................................ 713/2
(58) Field of Search ................................ 713/1, 2, 100

(56) References Cited

U.S. PATENT DOCUMENTS

| | | | |
|---|---|---|---|
| 5,261,104 A | | 11/1993 | Bertram et al. ............. 395/700 |
| 5,274,816 A | | 12/1993 | Oka ............................ 395/700 |
| 5,426,775 A | | 6/1995 | Boccon-Gibod ............ 395/575 |
| 5,448,741 A | | 9/1995 | Oka ............................ 395/700 |
| 5,537,540 A | | 7/1996 | Miller et al. ........... 395/183.14 |
| 5,596,711 A | * | 1/1997 | Burckhartt et al. ........... 714/23 |
| 5,754,853 A | * | 5/1998 | Pearce ............................ 713/2 |
| 5,787,491 A | | 7/1998 | Merkin et al. .............. 711/173 |
| 5,802,363 A | * | 9/1998 | Williams et al. ................ 713/2 |
| 5,822,582 A | | 10/1998 | Doragh et al. .............. 395/652 |
| 5,875,344 A | * | 2/1999 | Madina .................. 395/750.01 |
| 5,974,567 A | * | 10/1999 | Dickson, Jr. et al. ......... 714/27 |

* cited by examiner

Primary Examiner—Dennis M. Butler
(74) Attorney, Agent, or Firm—Timothy F. Myers

(57) ABSTRACT

A computer has a central processing unit, memory and an I/O subsystem. The I/O subsystem is linked to a mass storage device having a first partition, and a second partition containing a hibernation data storage area. The mass storage device further includes a partition table which indicates that the first partition is active to boot the computer and that the second partition is not active. The computer also has logic using the I/O subsystem to select which partition is to be used to boot the computer. The memory contains a program, in response to the logic to select the partition, which is capable of reading the partition table of the mass storage device and modifying it so that the selected partition is presented as active to the CPU for booting the computer.

35 Claims, 7 Drawing Sheets

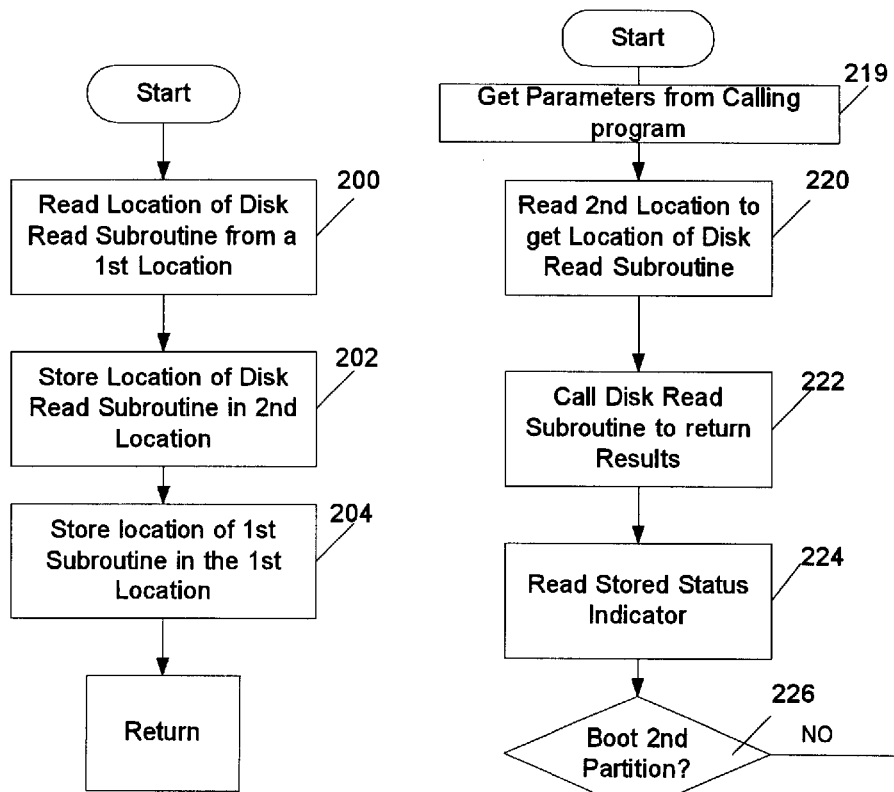
FIG. 7A
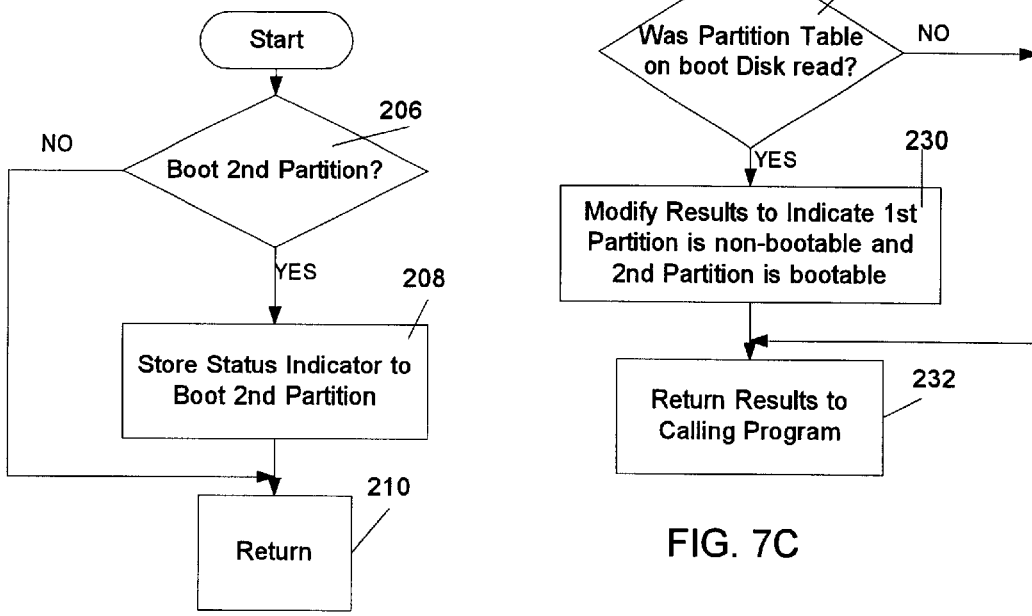
FIG. 7B
FIG. 7C

COMPUTER WITH BOOTABLE HIBERNATION PARTITION

FIELD OF THE INVENTION

The invention relates to a computer system. More particularly it relates to a computer capable of storing and booting secure utility programs by having the secure utility programs share a disk partition with hibernation data.

BACKGROUND OF THE INVENTION

Computer manufacturers have continued to provide users of personal computers (PCs) with a constant stream of new technology and features. However, as PCs become more complex, market pressures make it imperative that their use and operation become userfriendlier. By doing so, more users who are not technologically savvy will purchase PCs, thus creating an ever larger market. In addition, as computer manufacturers have driven down the cost of a PC, more users are beginning to perceive the PC as a simple appliance rather than a technological marvel. This change in assumption also leads the user to have increased expectations in regard to product quality and program and file security. Most appliances are very reliable and do not require a considerable amount of maintenance as has been the reputation for PCs. When appliances do fail, the user or a service technician is usually able to very quickly diagnose and repair it. Therefore, computer manufacturers are being driven to provide utility programs to either help prevent failures in the PC from occurring, or when they do, help the user or service technician quickly diagnose and repair the PC.

Most PCs are shipped with low-level software, called a BIOS, that provides a minimal set of self-tests when the PC is turned on or reset. These self-tests were written when the PC was originally designed in the early 1980's and were done primarily for the benefit of the computer manufacturers and their service organizations. Only a small amount of self-testing was performed due to the limited storage space in the BIOS of early PC's. The computer manufacturers only implemented as much testing as was required to execute a more complete diagnostic self-test that was loaded into the PC using a floppy drive. Because of the complexity of these complete diagnostic self-tests, they were generally not made available to users. Therefore, when a user experienced a PC that would not function properly, the PC had to be returned to the manufacturer's service center or a computer technician would have to make an office or house call. One difficulty in providing complete self-test programs to users was that the self-test programs could be damaged or lost if provided in a floppy disk format. Also, if the self-test programs were used on a PC not made by the manufacturer, it might cause the non-manufacturer PC to completely malfunction or fail. The cost of incorporating the self-test into the PC was prohibitive due to the amount of memory required in the limited BIOS.

Additionally, new PC technology has created additional reliability and file security concerns for the user. With the advent of multiple operating systems being available for a PC and their infamous upgrade cycles, many PCs have not been able to be upgraded due to the BIOS being unaware of the new features of the upgrade thus causing obsolescence. These PCs BIOS could not be upgraded due to the BIOS being stored in an integrated circuit chip. Most early PCs could either not have their BIOS chips removed or required professional removal and installation. Newer PCs have programmable BIOS chips but these chips increase the cost of the PC and have a high failure rate if the BIOS update procedure is not followed properly or some other event such as a power drop or surge occurs during programming.

Yet another reliability and file security concern that has been created with the growth of PC technology is the "computer virus." This computer virus is typically a cleverly designed program written by high-tech pranksters or saboteurs in order to harm or create havoc on the user's PC. Many viruses have been distributed which cause user's PC to have its mass storage device, such as a hard disk, completely erased. Virus protection programs have been written and sold which search for, remove, and clean up or prevent the damage that these viruses cause. New viruses, however, have been created that now seek out, attack, and destroy the virus checking programs themselves. The creators of the viruses can do this peril because there is little protection for one program on a PC to prevent another from accessing and modifying it.

Similarly, users are also experiencing mass storage file corruption and destruction because PCs have little or no security protection from unauthorized use and espionage. Even when PCs provide password protection, technical experts have become skilled at breaking or bypassing this limited security scheme. Numerous news articles have reported computer break-ins even at secure military sites such as the Pentagon and CIA. Because authorization security needs to be performed before the machine boots the operating system, it is difficult to add better security to the BIOS. One costly current alternative is to add custom circuitry which has its own specially coded microprocessor to the PC. However, without a low cost secure authorization technique provided by the PC manufacturer, the ordinary user is at tremendous peril to today's high-tech cyber thieves.

Therefore, PC manufactures need to provide a method by which they can not only assure a user that their PC is working reliably in several aspects but that it is also safe from product obsolescence, rogue viruses, and its files secure from unauthorized access.

SUMMARY

A computer has a central processing unit, memory and an I/O subsystem. The I/O subsystem is linked to a mass storage device having a first partition, and a second partition containing a hibernation data storage area. The mass storage device further includes a partition table which indicates that the first partition is active to boot the computer and that the second partition is not active. The computer also has logic using the I/O subsystem to select which partition is to be used to boot the computer. The memory contains a program, in response to the logic to select the partition, which is capable of reading the partition table of the mass storage device and modifying it so that the selected partition is presented as active to the CPU for booting the computer.

BRIEF DESCRIPTION OF THE DRAWINGS

FIG. 7A is a flow chart of a subroutine, in an alternative embodiment of the invention, used to trap access to a mass storage read subroutine.

FIG. 7B is a flow chart of a subroutine in the preferred and alternative embodiment of the invention used to set up a status indicator.

FIG. 7C is a flow chart of an intercept subroutine used in conjunction with the subroutine of FIGS. 7A and 7B in the alternative embodiment of the invention used to call and modify results returned from the mass storage read subroutine.

DETAILED DESCRIPTION OF THE PREFERRED AND ALTERNATE EMBODIMENTS

Figure 1:
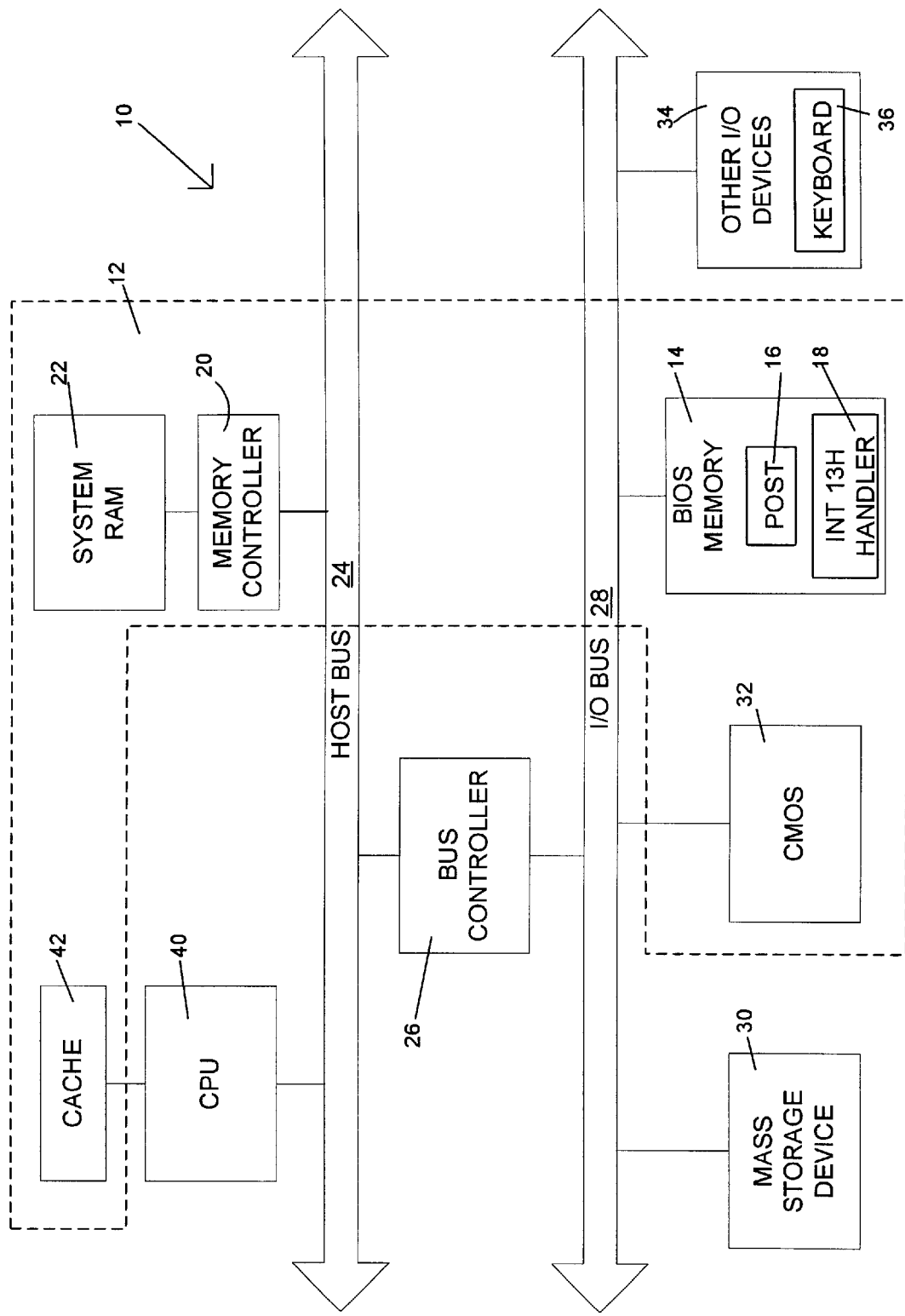
FIG. 1 illustrates a minimal block diagram of a personal computer.

Personal computers (PC) typically contain several forms of mass storage devices such as hard disk drives, floppy drives, compact discs (CD), and digital versatile disks (DVD) to name a few. These drives store user software such as operating systems (QS), application programs, and data files such as word processing documents, spreadsheets, and charts. The PC also contains low-level system software known as the Basic Input/Output System (BIOS) which is typically stored in an updateable low speed memory and moved into high speed memory when the PC is booted. When the PC is first turned on, a central processing unit (CPU) begins processing instructions (otherwise known as "executing") from a set of minimal diagnostic and device configuration routines called power-on self-test (POST). If POST completes successfully, the BIOS then proceeds to locate and boot (begin loading and executing) an OS or other bootable program using a mass storage device search routine.

As mentioned above, most information contained in a computer is stored on a mass storage device. Unless otherwise noted, "software", "operating system (OS)", "subroutine", and "program" refers to executable software programs while "data" refers generically to all forms of electronic information including software, operating systems, programs, and files created by software, operating systems, and programs. But in either case, all are stored on the mass storage device. "Executing" refers to the processing of CPU instructions. "Booting" refers to the process of relinquishing control of the CPU by the BIOS to an operating system or program which is then loaded and executed.

In the BIOS of an exemplary MSDOS/Windows PC, typically the mass storage device search routine is programmed to locate the OS by first searching for a floppy disk, and then searching a hard disk. This search technique allows the PC to be booted if either the hard disk has failed or a different OS is desired. Due to an increase in the amount of storage accessible in mass storage devices configured in a PC today, a user may have several OS loaded on the mass storage device. Several techniques have been implemented to allow for selecting from multiple operating systems resident on the mass storage device at boot time. Typical OS's found on a PC include MS-DOS, Windows 95/98, Windows 2000 (NT), Unix, Novell Dos, and Linux, to name a few. In addition, searching for CD-ROMs, DVDs and other replaceable-media mass storage devices as well as removable drives such as PCMCIA and Cardbus flash cards, to name a couple, have been integrated in the mass storage device search routine. These replaceable-media and removable drives are formattable such that they too can also be bootable mass storage devices like the hard disk and floppy drives.

Thus, a PC may have multiple mass storage devices attached to it to store several operating systems, programs, or data. However, to describe how to access the programs or data on the mass storage devices, the mass storage organization must be known. Physically, most mass storage devices are organized using the terminology of hard disk drives. Hard disks typically have at least one platter for storing programs or data. Each platter is divided into a number of concentric storage units called tracks. A track is further divided into sectors. Each platter is accessed by a top head and a bottom head which read and write data onto the hard disk. Logically, a hard disk may be divided into partitions, each partition having an amount of storage selectable at the time of creation of the partition, as long as the aggregate of all the partitions' storage area does not exceed the storage capacity of the hard disk. For example, a single 8 Mbyte hard disk could have three partitions logically named C: with 4 Mbytes of storage, D: with 3 Mbytes, and E: with 1 MByte. Partitions are further divisible into tracks, cylinders, and sectors for addressing purposes. Under the MS-DOS/Windows FDISK utility supplied by Microsoft, for example, a PC may have up to four disk partitions of differing types and sizes. The differing types may be MS-DOS/Windows types such as FAT12, FAT16, FAT32, or other non MS-DOS/Windows types, thus allowing more than one OS to be installed on the same hard disk. Also, additional disk partitions types are reserved for future uses. One of these reserved partitions has been designated to be used to store the contents of the PC memory during a sleep state of the PC. This sleep state is often referred to as "hibernation mode", or alternatively, "save-to-disk mode". Hibernation mode allows the PC to conserve power by being in an off state but still maintaining the operating environment of the user before entering this sleep state. When the PC is turned back on from hibernation mode, the PC is restored to previous operating environment thus reducing boot time. Typically, one partition on a mass storage device in the PC is used to store the PC's memory and this "hibernation partition" is made non-bootable and is hidden from the operating system so that it can not be accessed or corrupted. Since the control of the PC power states are typically handled by the BIOS, only the BIOS code is aware of how to access and read and write the data areas of a hibernation partition.

Each hard disk has a single partition table, that contains information pertaining to the size, type, and location of disk partitions. The partition table is typically recorded on the first sector of the first track under the first head. The partition table is also typically called the master boot record (MBR). A boot record's purpose is to control system operation of the PC for that brief period of time when the fall operating system has not been loaded into memory. The boot record sees to it that the operating system can be loaded from the mass storage device. When the PC is turned on, the BIOS loads the partition table, or MBR, into memory and transfers control to it. The code in the MBR, in turn, locates the currently selectable bootable partition, then loads that partition's boot record and transfers control to it. Since the partition table is not inside any logical drive, and since most OS's deal only with logical drives, this record of the mass storage device can not be accessed by the OS and thus the user without special software.

As mass storage devices have increased their capacity to store data, more BIOS's for several operating systems, such as MS-DOS/Windows in particular, have been modified to allow partitioning the mass storage device storage space into different partitions. In addition, the increased data storage capacity of the mass storage devices provides the opportunity for PC manufactures or resellers to pre-load a partition within the mass storage devices with useful utility programs to provide new features or functionality for their products. However, PCs with a hibernation partition creates difficulty for PC manufactures which would like to add this additional functionality. For example, with a MS-DOS/Windows PC using the FDISK disk partitioning utility, only four partitions may exist on a mass storage device. Note that if a bootable operating system partition and a hibernation partition each occupy one of the four partitions, only two remaining partitions are available. If special utility programs are placed in one of the remaining two partitions by the PC manufacturer, only one partition would remain for the user to load as he or she desires. Further, the special utility programs might be deleted by the user or corrupted by improper software or computer viruses. Thus a need exists to have special system utility programs that are securely loaded on the mass storage device. The special system utility programs need to be unavailable to the user and protected from possible corruption from software misbehavior or viruses without using an additional partition on the mass storage device.

FIG. 1 is a block diagram illustrating the major components of a personal computer (PC) 10 which implements the preferred and alternate embodiments of the invention. A central processing unit (CPU) 40 is linked to cache memory 42 and a host bus 24 to a memory controller 20. The memory controller 20 is used to interface the system RAM 22 to the CPU 40. The CPU in an MS-DOS/Windows PC is typically a Pentium, Pentium II, Celeron, Xeon, Merced, or McKinley processor manufactured by Intel, or an equivalent clone manufactured by AMD or National Semiconductor, to name a few. Those skilled in the art will appreciate that other CPU architectures such as Apple's MacIntosh PowerPC, and Sun Microsystems Sparc Processor exist and still meet the scope and spirit of the invention. The system RAM 22 is typically DRAM, Synchronous DRAM, SRAM, or RAMBUS memory but other types may be used and still meet the scope and spirit of the invention. The cache 42 attached to the CPU 40 is generally controlled directly by the CPU 40 to allow for high-speed access. The host bus 24 may be the CPU's 40 standard bus interface or it may be a conventional bus standard such as PCI. The host bus 24 is also used to interface to other high speed devices such as graphic displays (not shown) and network interfaces (not shown). The CPU 40 usually interfaces to slower devices using an I/O bus 28 which is typically linked to the host bus 24 using a bus controller 26. Slower memory is usually linked to this I/O bus 28 so that accesses to the slower devices does not prevent the CPU 40 from accessing the high speed devices on the host bus 24. Slower memory devices typically used in PC's include non-volatile data and status storage such as CMOS 32 memory, and a BIOS 14 stored in a device such as ROM, EEPROM, or Flash to name a few. The cache 42, system RAM 22, CMOS 32, and BIOS 14 are typically referred to as the "memory" 12 of the CPU. When the PC 10 is turned on or reset, CPU instructions stored in the BIOS 14 are executed and the contents of the BIOS 14 are preferably transferred to an area in the system RAM 22 to allow the CPU 40 to execute faster. The BIOS 14 contains two important programs used in conjunction with the invention, Power-On Self Test (POST) 16 code and a disk read subroutine, such as the routine accessed in an MS-DOS/Windows computer through a software interrupt handler called INT 13H. Usually in most PC's the mass storage device 30 is connected to the I/O Bus 28. Those skilled in the art will appreciate that mass storage devices are also sometime found on the host bus 24 and still meet the scope and spirit of the invention. The mass storage device 30 may include one or more floppy disk drives, hard disk drives, CD-ROM drives, DVD drives or other specialized mass storage devices such as PCMCIA and CardBus disk drives and solid state memory. The I/O bus 28 also allows the CPU to be linked to other I/O devices 34 for receiving input, such as preferably from a keyboard 36, or other input devices such as a mouse, trackpoint, pen, or touchpad to name a few.

Figure 2:
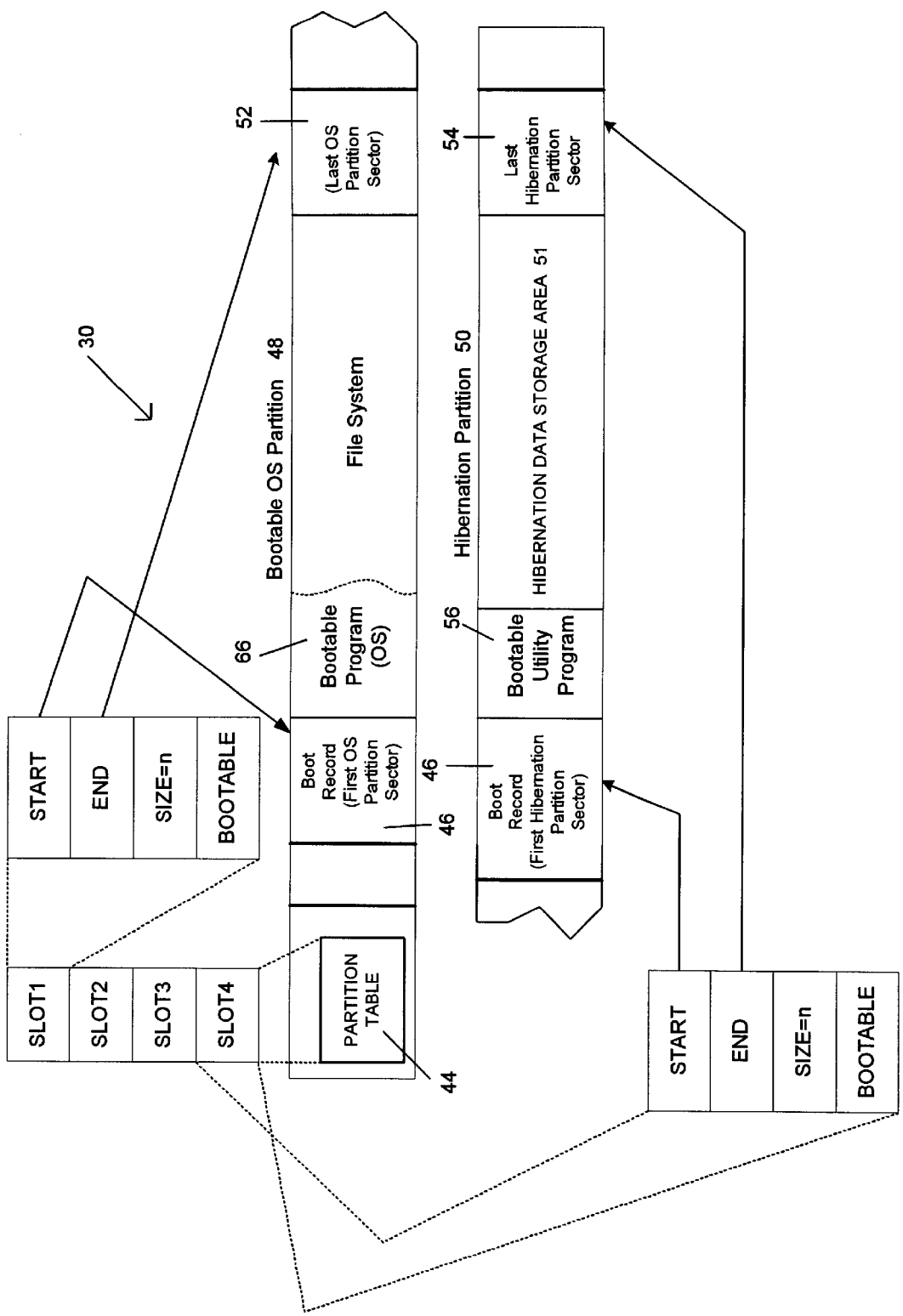
FIG. 2 illustrates the mass storage organization for the preferred embodiment of the invention.

FIG. 2 is a diagram illustrating the preferred embodiment for the formatting of a mass storage device 30 for a personal computer 10 that has at least two partitions: a bootable OS partition 48, and a hibernation partition 50. The mass storage device 30 has on its media a conventional partition table 44 used to describe the starting location, ending location, size, and bootable state of each partition. The starting location of each partition is also the location of each partition's boot record 46 which contains code to allow the computer 10 to boot from each respective partition on the mass storage device 30. The ending location of each partition is the last sector location on the mass storage device used by the respective partition. Each partition is a contiguous set of sectors which begins with the partition boot record 46 and ends at the last sector. For the bootable OS partition 48, the last sector is shown as last OS partition sector 52 and for the hibernation partition 52, the last sector is shown as last hibernation sector 54.

At boot, the BIOS 14 must determine which partition on a mass storage device to use for booting the PC. For example, on a conventional MSDOS/Windows PC, there are only up to four partitions allowed on the hard disk when the user uses the FDISK utility to partition the hard disk. Only one of these partitions is allowed to be set as active or "bootable". The BIOS 14 loads the Master Boot Record (MBR) from the partition table and passes control to it. The MBR, in turn, selects the "bootable" partition as indicated in the partition table to load the operating system. The hibernation partition 50 is used by the BIOS 14 to save the contents of the PC's memory when the PC 10 is powered off or put in a sleep state. This hibernation mode is used to allow the PC 10 to quickly come back on to the state that the user left the PC 10 in before turning off. This technique minimizes the amount of time required by the user to wait for the PC 10 to boot and for the user to reconfigure the PC 10 back to the state the user was working at on the PC 10. The hibernation partition 50 is indicated as inactive for booting and hidden (i.e., unavailable) from the operating system by using a reserved type of partition that is not supported by the operating system.

The hibernation partition 50 of the invention is a modified hibernation partition in relation to conventional PCs in that the modified hibernation partition incorporates a secure bootable utility program area 56 into the hibernation data storage area. The active bootable state for this modified hibernation partition 50 is still set to be non-active or "non-bootable" as for the conventional PC's hibernation partition. The active bootable state for the bootable OS partition 48 which includes a bootable program 66, such as an operating system, is still set to be active or "bootable" as for a conventional PC. By including the bootable utility program area 56 within the hibernation data storage area, the two remaining slots in the partition table 44 remain available for either extended file systems or alternative operating systems and their respective file systems. However, since the bootable utility program area 56 is flagged in the partition table as not being bootable, the bootable utility program is incapable of booting using the normal boot process and is unavailable to the user thereby preventing accidental erasure, corruption, and modification.

Since this hibernation partition 50 is only accessed by the BIOS, a user or misbehaving software is kept from tampering, altering, or removing the utility software thus providing security. In one embodiment, the first few megabytes of the hibernation partition 50 holds a bootable utility program area 56 portion having a simple OS (such as MSDOS) and the utility programs and any required associated files. Alternatively, a stand-alone bootable utility program without an operating system is stored in the hibernation partition 50. The hibernation data storage area 51 resides in the hibernation partition 50 after the end of the bootable portion. This modified hibernation partition 50 is, in effect, subdivided into the bootable utility program area 56 and the hibernation data storage area 51. The modified hibernation partition 50 is still indicated as non-bootable in the partition table. In one embodiment, a user invokes the utility program at boot time of the PC preferably using a hot key, such as F10. Other input sequences to the PC could be used to invoke the utility program and still meet the spirit and scope of the invention.

Several different types of applications lead themselves to being able to use and apply this secure storage of the utility program. One example is a fully functional diagnostic self-test program that provides more in depth testing of the hardware and better reporting of failures than does the POST routine. Having a diagnostic test that provides a high level of confidence in detecting and reporting hardware failures is a great convenience to users and PC manufacturers. Users often times have difficulty in determining whether a given problem is a hardware defect, a computer mis-configuration, or a software bug. If there is a hardware defect, then it must be returned to the manufacturer for repair, thus impairing the use of the PC by the user. Furthermore, if the repair is covered by warranty, then the manufacturer must pay to test, diagnose, and repair the computer. If the diagnostic self-test program can affirm to the user that the computer is functioning correctly, then the manufacturer saves money and the user saves having to return his computer for service.

Another application that is able to take advantage of the invention is a BIOS update program. In order to lower costs, a non-programmable memory device, such as a masked ROM or a programmable only ROM (PROM) is used to hold a minimal BIOS in the PC. A fully functional BIOS is stored in the bootable utility program area 56 of the hibernation partition 50. Upon boot, the minimal BIOS loads the BIOS stored on the mass storage device hibernation partition 50 into DRAM and then passes control to the BIOS loaded in the DRAM. A separate program is provided which allows the user to update the BIOS stored on the mass storage device.

If the user has multiple operating systems stored on the disk, it may at times be desirable to have an auxiliary inactive partition further secured by using encryption/decryption to prevent a virus implanted in one OS from accessing and attacking data stored in a partition holding another OS. It is desirable to have the encryption/decryption routine available on the PC in such a manner that the user is not able to corrupt or modify it and such that it is able to operate directly on the data of the mass storage device without having to be loaded by the user's operating system, which opens it to compromise by virus programs. The invention provides just such a secure method by which an encryption/decryption program is stored and hidden in the hibernation partition 50 and at boot time, invoked by the user or a system administrator to encrypt or decrypt partitions on the mass storage device.

A similar approach as used with encryption/decryption also allows for a secure utility program that provides special virus checking and file repair. By having the virus checking software located in the hibernation partition 50 and unavailable to the user or possible viruses, it is more immune to possible invasion.

Another application for the secure utility program space provided by the invention is to have a secure utility program automatically invoked by the BIOS 14 on boot to provide a user authorization program that provides for more secure password protection than that typically found in a contemporary PC BIOS. Most BIOS's are limited in the amount of code space available. By being able to boot and load a secure program, additional security authorization protocols are implement able such as voice recognition using a microphone in the computer, and signature recognition using a touchpad in the computer, to name a couple.

Figure 3:
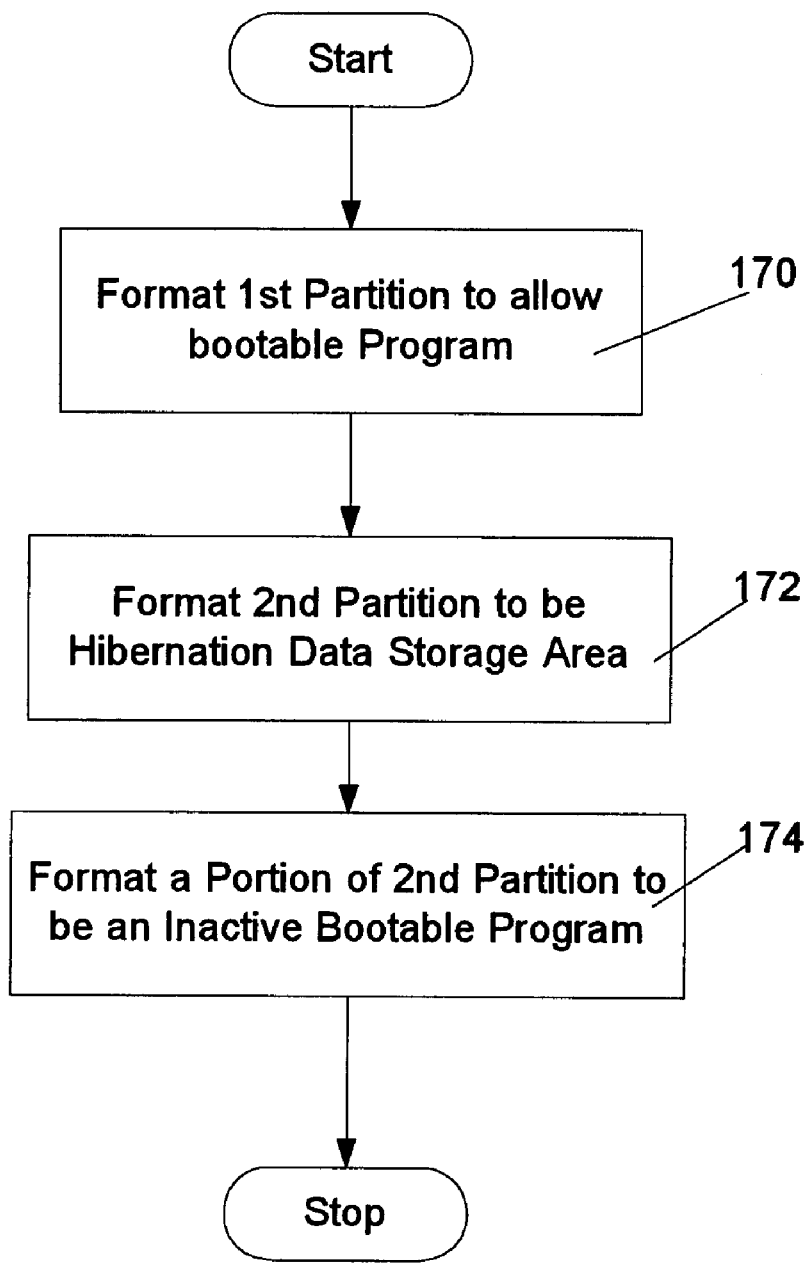
FIG. 3 is a flow chart of the preferable steps required to prepare a mass storage device used in the preferred embodiment of the invention shown in FIG. 2.

FIG. 3 is a block diagram of the process used to create a mass storage device 30 using the new formatted hibernation partition 50. In block 170, the first partition is formatted to allow a bootable operating system, such as MS-DOS/Windows, and its respective file system. Then in block 172, the mass storage device 30 is formatted to have a second partition to allow a hibernation data storage area which is a reservation of a large number of consecutive disk sectors. In block 174, the mass storage device 30 has its second partition reformatted to include a portion which includes a bootable utility program area 56 that is not flagged as active, thus being "unbeatable". Since the BIOS 14 is the only software that reads and writes data to the hibernation data storage area when entering and leaving hibernation mode, the starting address for the hibernation data storage area can be easily adjusted. The net effect to the user is that the hibernation partition 50 contains additional sectors to incorporate the bootable utility program area 56 and only these sectors are unavailable to the two additional partitions for storage use. Since the modified hibernation partition 50 is flagged as being inactive and not accessible by the bootable operating system, the BIOS 14 must be modified to invoke and execute the utility program.

Figure 4:
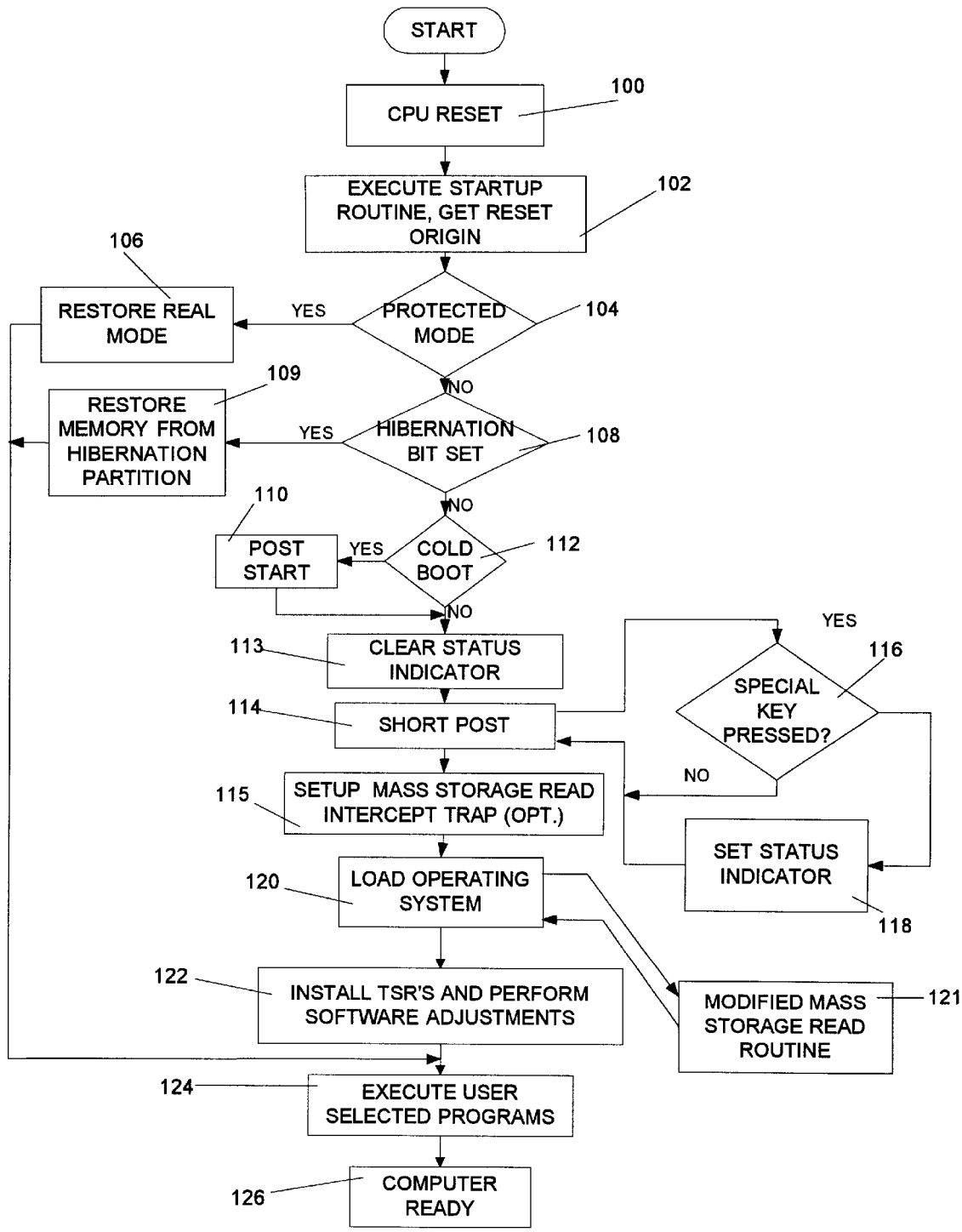
FIG. 4 is a flow chart showing an exemplary boot process with the modified steps of the preferred embodiment of the invention used to boot a personal computer having a modified hibernation file shown in FIG. 2.

FIG. 4 is a block diagram of an exemplary boot sequence for a PC BIOS using an MSDOS/Windows architecture which implements the preferred embodiment of the invention. First, the computer is initially turned on or the CPU 40 is reset in block 100. The BIOS 14 then executes any startup routines required for the particular electronic chip sets to configure them properly before retrieving the origin of the reset in block 102. In block 104, the reset is checked to see if the CPU is to be taken out of protected mode. If so, the program flow continues to block 106 which restores real mode and then the BIOS 14 jumps to block 126 to return control to a previously loaded operating system. In block 108, the source of the reset is checked to see if the PC 10 is to come out of hibernation mode by checking a hibernation bit. If so, the program flow proceeds to block 109 where the data previously stored in the hibernation partition 50 on mass storage device 30 is read and written to system DRAM 22 and then control is returned to the restored operating system. In block 112, the CMOS 32 is checked to see if a fall POST cold boot is to be performed. If so, then in block 110 a full POST test is performed to fully configure and test various system functions. If a full POST cold boot is not to be performed, program flow continues to block 113 and then block 114 where a short POST sequence is performed to finalize setting up the system. Block 113 clears a status indicator which is preferably implemented using a status bit in the CMOS memory 32. The short POST of block 114 contains special code allow the user of PC 10 to indicate to the BIOS 14 that the bootable utility program 56 should be loaded rather than the operating system in the bootable OS partition 48. At various intervals during the short POST test of block 114, a decision block 116 checks to see if a predetermined input sequence has been entered by the user. In one embodiment, this input sequence is the pressing of the F10 key on keyboard 36. If the input sequence is detected, then the status indicator is set in block 118, otherwise the short POST test of block 114 continues its operation.

After the short POST in block 114 in an alternate embodiment of the invention, the program flow proceeds to an optional routine (See FIG. 7A) which "intercepts" calls to a mass storage read function of the BIOS (for example, INT 13H in a MSDOS PC) in block 115. The program then begins loading the operating system in block 120. When the operating system is being loaded, several program calls are made to the BIOS mass storage read routine to determine which partition to boot from the mass storage device. This BIOS mass storage routine is modified in the preferred and alternative embodiments (see FIGS. 6 and 7C) to detect and alter reads from the mass storage device's partition table as illustrated in block 121. After the operating system is loaded, typically various terminate and stay ready (TSAR) in block 122, and software drivers, and other software adjustments in block 124 are usually performed before the computer is ready for the user in block 126.

Figure 5:
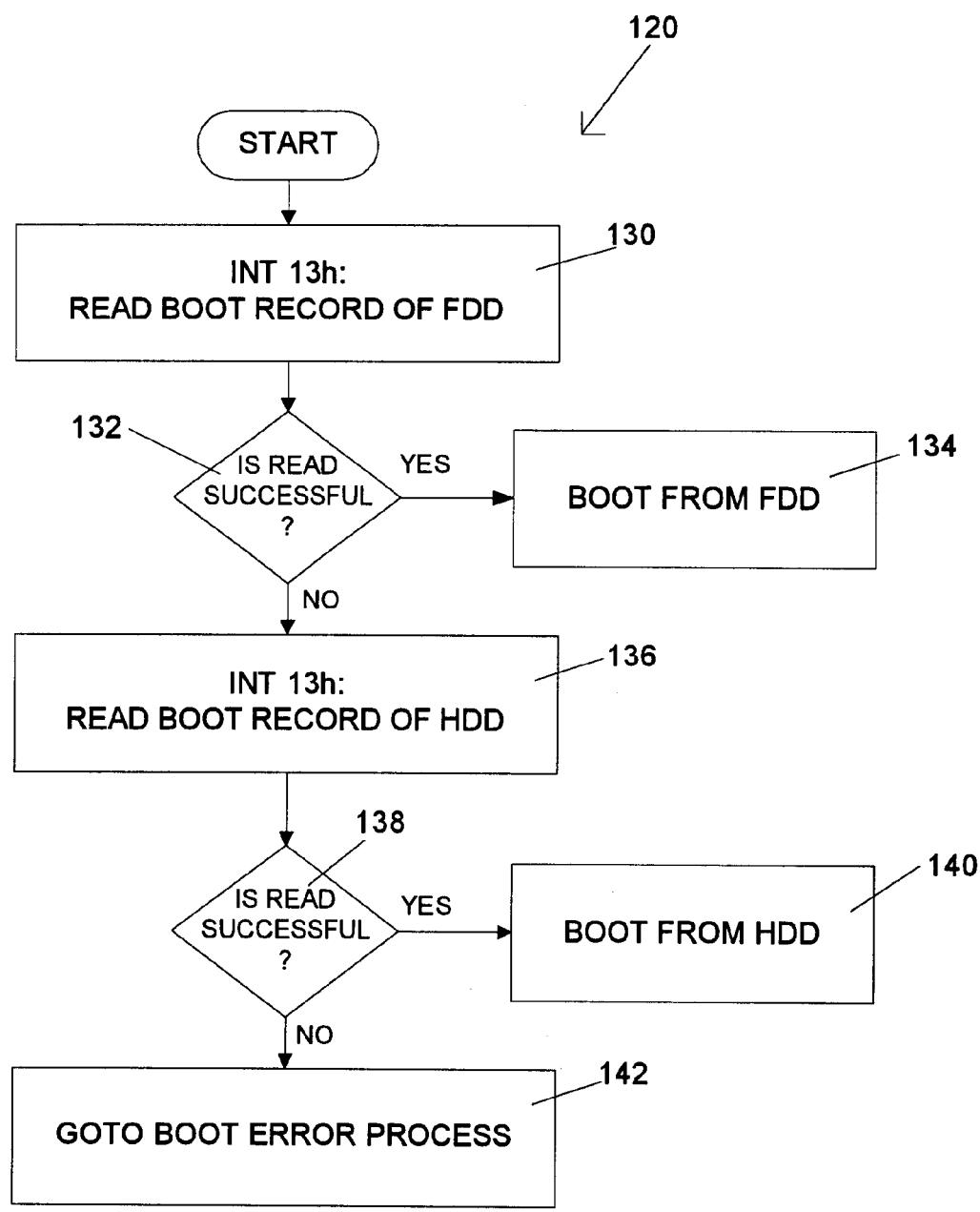
FIG. 5 is a flow chart showing the exemplary steps necessary to locate and load an operating system on a conventional MSDOS/Windows personal computer.

FIG. 5 is a block diagram of an exemplary MSDOS/Windows PC block 120 shown in FIG. 4 in which the BIOS 14 tries to boot the operating system. First the BIOS 14 performs a mass storage device read by calling an INT 13H software interrupt routine to read the boot record of a floppy disk drive (ADD) in block 130. If the read returns that it was successful in block 132, the BIOS 14 will boot an operating system from the ADD in block 134. If the read was unsuccessful, then another mass storage device read is performed to read the master boot record (the partition table) from a hard disk drive (ADD) in block 136. If this read was successful then the BIOS 14 will proceed to block 140 where the ADD will be used to boot an operating system. If the read of the master boot sector from the ADD was unsuccessful, then the BIOS 14 proceeds to block 142 where a boot error process will alert the user of PC 10 that the BIOS 14 was unable to boot the PC 10. Although only the ADD and ADD are shown as being checked for boot ability, further refinements of the BIOS have been developed to include the booting of CD-ROMs and other replaceable or removable mass storage devices and still meet the spirit and scope of the invention.

Figure 6:
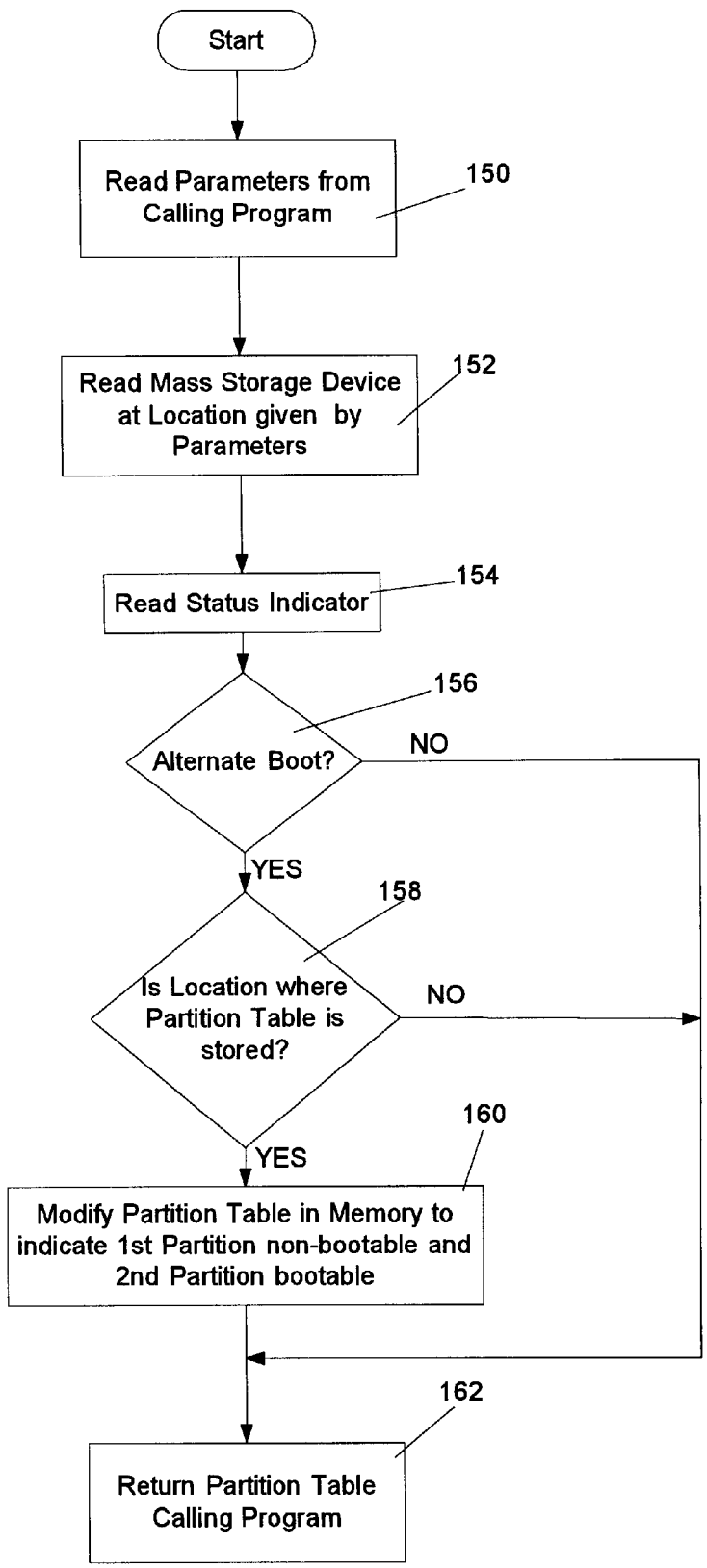
FIG. 6 is a flow chart of a subroutine, in the preferred embodiment of the invention, which modifies the data read from a partition table on a mass storage device.

FIG. 6 is a block diagram of the logic used in an exemplary embodiment of the invention of a modified mass storage read subroutine which allows booting the bootable utility program area 56 stored in the hibernation partition 50 on a mass storage device 30.

First, in block 150, the parameters from the calling program are retrieved. The parameters are used to describe the location of the sector or multiple sectors to read from the mass storage device 30. In block 152, the parameters are used to read the desired location on the mass storage device 30. In block 154, the status indicator is retrieved and compared in decision block 156 to determine if the bootable utility program area 56 should be booted. If not, then the data read from the mass storage device 30 is returned to the calling routine in block 162. If the bootable utility program area 56 is to be booted, then in block 158 the parameters are compared to the location of where the partition table 44 is stored. If the parameters do not match the location of the partition table 44 then the data read from the mass storage device 30 is returned to the calling program. If the parameters match the location of the partition table 44, then in block 160 the data read from the mass storage device 30 contains the partition table contents and these contents are modified. This modification is done to indicate that the first partition, the bootable OS partition 48, is made non-active or "non-bootable" and the second partition, the hibernation partition 50, is made active or "bootable". The read and modified contents of the partition table are then returned to the calling program in block 162. By only returning the read and modified contents of the partition table, additional protection is provided, although not required by the invention. If the actual partition table on the mass storage device 30 were modified, and a utility program causes the machine to hang up or some another failure occurs, the computer may not be able to reboot the original operating system properly. In addition, if the mass storage device where then removed and placed in another PC, it still would not boot properly.

FIGS. 7A to 7C are block diagrams of an alternative embodiment of the invention that instead of modifying the mass storage read routine, the mass storage read routine call is intercepted and replaced with a new subroutine which calls the mass storage read routine and then modifies its results if the bootable utility program area 56 is to be booted. Most modern BOSS allow the mass storage read subroutines to be intercepted to allow for the addition of future mass storage devices that weren't contemplated or implemented when the BIOS was originally coded. The advantage of this embodiment is that new mass storage devices can be added to the PC, including those having removable media that can be inserted and removed from the mass storage device, and allowed to become the preferred boot drive and still allow implementation of the invention.

FIG. 7A is a block diagram of the setup of the preferable method to intercept the mass storage read routine. In block 200, the location of the mass storage read routine is read from a first memory location. Then in block 202, the location of the mass storage read routine is stored in a second memory location. In block 204, the location of the new subroutine is stored in the first memory location, thus intercepting calls to the mass storage read routine.

FIG. 7B is a block diagram of a the setup of determining if the second partition, the bootable utility program area 56 in the hibernation partition 50, is to be booted beginning in block 206. If so, then in block 208 the status indicator is set to indicate that the second partition is to be the bootable partition.

FIG. 7C is a block diagram of a new program, in the alternative embodiment of the invention, which is called in place of the mass storage read routine and thus "intercepts" the mass storage read routine. In block 220, the second memory location is read to retrieve the location of the original mass storage read routine. Then in block 222, the mass storage read routine is called to read the location of the mass storage device 30 determined by the parameters passed to the new routine from the calling program and received in block 219. In block 224, the stored status indicator is read and then in block 226 it is used to determine if the second partition is to be booted. If the second partition is not to be booted then the results read from the mass storage device are returned to the calling program in block 232. If the second partition is to be booted, then in block 228, the parameters are checked to see if the partition table on the mass storage device was read. If not, then the results read from the mass storage device are returned to the calling program. If the partition table was read, then in block 230, the read results are modified to indicate that the first partition is not active or "non-bootable" and that the second partition is active or "bootable". Then in block 232 the modified results of the partition table are returned to the calling program.

The benefits of the invention are that the user of a PC is able to run secure utility programs, such as a fall diagnostic suite, at boot. No additional product cost or loss of disk partitions are incurred in order to offer the secure utility program, nor is there any appreciable loss of mass storage space to the user. In addition, the secure utility program is protected from accidental erasure. Although specific embodiments of the invention have been described and illustrated, the invention is only limited by the claims.

What is claimed is:

1. A computer, comprising:

a central processing unit (CPU);

a memory linked to said CPU;

an input/output (I/O) subsystem linked to said CPU;

a mass storage device linked to the I/O subsystem, said mass storage device comprising a first partition, a second partition having a hibernation data storage area, and a partition table indicating that the first partition is active for booting the computer and that the second partition is not active for booting the computer;

logic means between said I/O subsystem and said CPU for selecting which bootable partition is to be used to boot the computer; and a first program in said memory, in response to said logic means for selecting, capable of reading said partition table and capable of modifying said read partition table so that the selected partition is presented as active to said CPU for booting the computer.

2. The computer of claim 1 wherein said partition table located on said mass storage device is not modified.

3. The computer of claim 1, wherein said logic means for selecting comprises:

an input device linked to said I/O subsystem capable of receiving input sequences; and a second program in said memory capable of detecting that a predetermined input sequence has been received.

4. The computer of claim 1 wherein the second partition contains a utility program that is capable of executing after the second partition is presented as active to said CPU.

5. The computer of claim 4 wherein said utility program is a diagnostic test program.

6. The computer of claim 4 wherein said memory contains a BIOS and wherein said utility program is capable of updating said BIOS.

7. The computer of claim 4 wherein said utility program is capable of encrypting and encrypting the first partition.

8. The computer of claim 4 wherein said utility program is capable of virus checking the memory and the first partition.

9. The computer of claim 4 wherein the first partition contains data and programs and wherein said utility program is a user authorization program to limit access to the data and the programs stored on the first bootable partition.

10. The computer of claim 9 further comprising a microphone and wherein the user authorization program is capable of implementing voice recognition using said microphone.

11. The computer of claim 9 further comprising a touchpad and wherein the user authorization program is capable of implementing signature recognition using said touchpad.

12. A mass storage device, comprising:

a first partition having a first bootable program;

a modified hibernation partition having a hibernation data storage area and a secure bootable utility program incorporated into the hibernation data storage area;

a partition table having a first entry for said first partition and a second entry for said modified hibernation partition, said first entry and said second entry having an active flag, the first entry having the active flag set, and the second entry having the active flag not set.

13. The mass storage device of claim 12 wherein the mass storage device further comprises media for storing said first partition, said second partition, and said partition table and wherein said media is capable of being inserted and removed from said mass storage device.

14. The mass storage device of claim 12 wherein said mass storage device further comprises at least one additional partition, and wherein said partition table has an entry for each additional partition, said entry having the active flag not set.

15. A computer comprising at least one mass storage device of claim 12.

16. A program for modifying the results returned from a mass storage device read operation wherein the mass storage device has a first partition, a second partition having a hibernation data storage area and a partition table indicating the active bootable states of the first partition and the second partition, the program comprising:

logic means capable of receiving a set of parameters from a calling program;

logic means capable of reading the contents of the mass storage device at a designated location given by the set of parameters;

logic means capable of comparing the designated location to a pre-determined location to determine if the contents of the mass storage device at the designated location contains the partition table indicating the active bootable states;

logic means capable of modifying the read contents of the partition table to indicate that second partition having the hibernation data storage area is the active bootable partition and that the first partition is not the active bootable partition without changing the contents of the partition table contained on the mass storage device; and logic means capable of returning the contents of the read partition table to the calling routine.

17. The program of claim 16, further comprising:

logic means capable of determining that the partition table should be modified; and logic means capable of executing the logic means capable of comparing the designated location, and the logic means capable of modifying the read contents of the partition table.

18. A computer comprising the program of claim 16.

19. A program for altering the boot sequence of a computer having a mass storage device having a first partition, a second partition having a hibernation data storage area, and a partition table indicating that the first partition is bootable and that the second partition is not bootable, the program comprising the steps of:

reading a set of parameters passed from a calling program;

reading the contents of the mass storage device at a designated location given by the set of parameters;

detecting that the set of parameters matches a predetermined location which indicates that the contents of the partition table on the mass storage device has been read;

modifying the read contents of the partition table to indicate that the first partition is non-bootable and that the second partition having the hibernation data storage area is bootable; and returning the modified read contents of the partition table to the calling program.

20. The program of claim 19, further comprising the steps of:

determining that the second partition, and not the first partition, is to be used for booting and then executing the steps of detecting and modifying; else returning the read contents of the partition table to the calling program.

21. A program for altering a boot sequence of a computer from a calling program which passes a set of parameters to the program, the computer having a boot disk with a first partition, a second partition having a hibernation data storage area, and a partition table indicating that the first partition is bootable and that the second partition is non-bootable, the program comprising the steps of:

reading the boot disk using the set of parameters to return a set of results;

comparing the set of parameters with a first value to determine that the partition table was read;

modifying the returned set of results to indicate that the first partition is non-bootable and that the second partition having the hibernation data storage area is bootable without modifying the contents of the partition table on the boot disk; and returning the modified set of results to the calling program;

wherein the computer boots using the second partition and not the first partition.

22. The program of claim 21, further comprising the steps of:

detecting that the second partition is to be used during the boot sequence of the computer; and if so executing the steps of comparing the set of parameters and modifying the returned set of results.

23. The program of claim 22 wherein the step of detecting further comprises the step of detecting that a pre-determined input sequence has been entered into the computer.

24. The program of claim 21, wherein the steps are performed in an INT 13H software interrupt vector program in the BIOS of an MS-DOS/WINDOWS based computer.

25. A BIOS encoded to use the program of claim 21.

26. A computer comprising logic capable of using the program of claim 21.

27. A method for altering a boot sequence of a computer having at least one boot disk with a first partition, a second partition, and a partition table indicating that the first partition is bootable and that the second partition is non-bootable, the method comprising the steps of:

reading the location of a disk read program from a first memory location;

storing the location of the disk program in a second memory location; and storing the location of a first program in the first memory location, said first program comprising the steps of, reading the second memory location to retrieve the location of the disk read program, calling the disk read program to return a set of results, comparing the returned set of results with a first valve to determine that the partition table was read, modifying the returned set of results to indicate that the first partition is non bootable bootable and that the second partition is bootable without modifying the contents of the partition table on the at least one boot disk, and executing a return instruction from the program to return the modified returned set of results to a program that called the first program;

wherein the computer boots using the second partition and not the first partition of the at least one boot disk.

28. The method of claim 27, further comprising the steps of:

detecting that the second partition is to be used during the boot sequence of the computer;

storing a status indicator representing that the second partition is to be used during the boot sequence of the computer; and wherein the first program further comprises the steps of, reading the stored status indicator, and executing the steps of comparing the returned set of results, and modifying the returned set of results if said stored status indicator denotes that the second partition is to be used during the boot sequence of the computer.

29. The method of claim 27, wherein the step of detecting further comprises the step of detecting that a pre-determined input sequence has been entered into the computer.

30. The method of claim 27, wherein the first address location is designative of an INT 13H software interrupt vector location in an MS-DOS/WINDOWS based computer.

31. A computer comprising logic capable of using the method of claim 27.

32. A method for booting a mass storage device in a computer, the mass storage device having a plurality of partitions, the mass storage device including a partition table representing the bootable states of the plurality of partitions and a first partition having an active bootable program, the method comprising the steps of:

modifying a second partition having a hibernation data storage area to include a non-active bootable program in addition to the hibernation data storage area;

during a booting process of the computer using the mass storage device, detecting that the non-active bootable program is to be booted;

reading the partition table; and modifying the results read from the partition table to indicate that the non-active bootable program is to be used during the booting process and that the active bootable program is not to be used during the booting process.

33. A computer capable of using the method of claim 32.

34. A method for formatting a mass storage device with multiple partitions, the method comprising the steps of:

formatting a first partition to be an active bootable partition;

formatting a modified hibernation partition to be a hibernation data storage area; and formatting a portion of the modified hibernation partition to incorporate a secure bootable utility program.

35. A computer comprising at least one mass storage device formatted using the method of claim 34.

* * * * *

UNITED STATES PATENT AND TRADEMARK OFFICE
CERTIFICATE OF CORRECTION

PATENT NO. : 6,385,721 B1　　　　　　　　　　　　　　　　　　　　　　　Page 1 of 1
DATED : May 7, 2002
INVENTOR(S) : Puckette It is certified that error appears in the above-identified patent and that said Letters Patent is hereby corrected as shown below:

Column 11,
Line 57, delete the second "encrypting" and insert therefor -- decrypting --.

Signed and Sealed this

Eleventh Day of November, 2003

JAMES E. ROGAN
*Director of the United States Patent and Trademark Office*